United States Patent [19]
Frezzolini

[11] 3,920,318
[45] Nov. 18, 1975

[54] FILM DRIVE ASSEMBLY
[75] Inventor: James Frezzolini, Ringwood, N.J.
[73] Assignee: Frezzolini Electronics, Inc., Hawthorne, N.J.
[22] Filed: Aug. 23, 1974
[21] Appl. No.: 500,034

[52] U.S. Cl.................................. 352/35; 352/191
[51] Int. Cl.² ........................................ G03B 31/00
[58] Field of Search ............... 352/35, 27, 191, 194

[56] References Cited
UNITED STATES PATENTS
2,196,358  4/1940  Heinisch .............................. 352/35
3,330,616  7/1967  Teeple ............................. 352/27 X Primary Examiner—Monroe H. Hayes
Attorney, Agent, or Firm—Ryder, McAulay, Fields, Fisher & Goldstein

[57] ABSTRACT

A film drive assembly for advancing film in a sound recording movie camera comprising a support plate which rotatably supports a drive shaft adapted to be driven by a motor. The drive shaft drives a film claw which is adapted to move the film past an aperture to permit the film to be exposed. Film moving means is mounted on the support plate for moving the film through the camera and, in particular, past a recording head so that the event being filmed can be recorded on the film. Gearing means is connected to the shaft and is in driving relationship with the film moving means to drive the film moving means. The gearing means comprises a gear in meshing engagement with the film moving means and a resilient connecting member that connects the gear with the drive shaft to eliminate intermittent variations in the speed of movement of the film moving means to prevent wow and flutter from being recorded on the film.

7 Claims, 5 Drawing Figures

U.S. Patent    Nov. 18, 1975    3,920,318
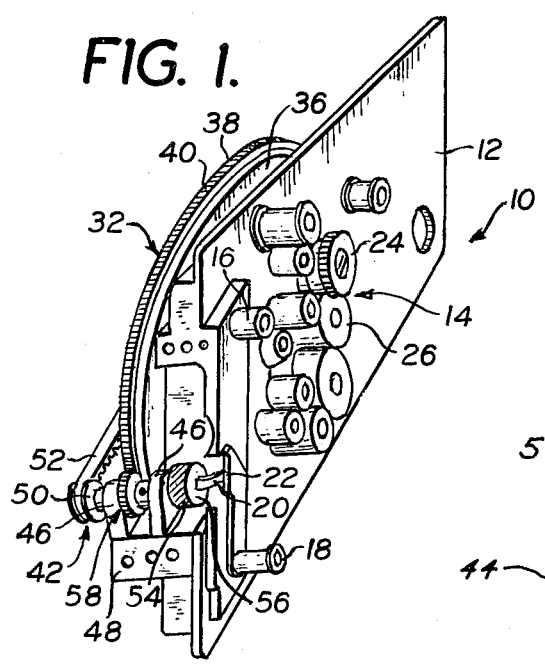
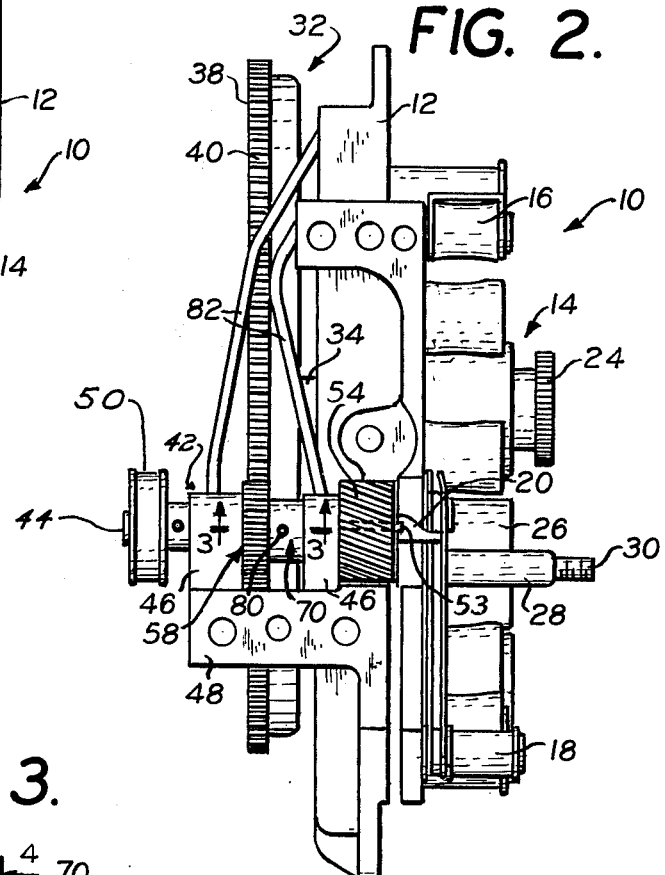
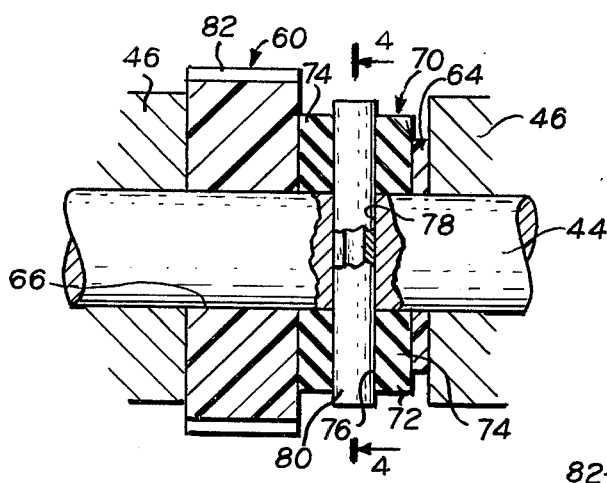
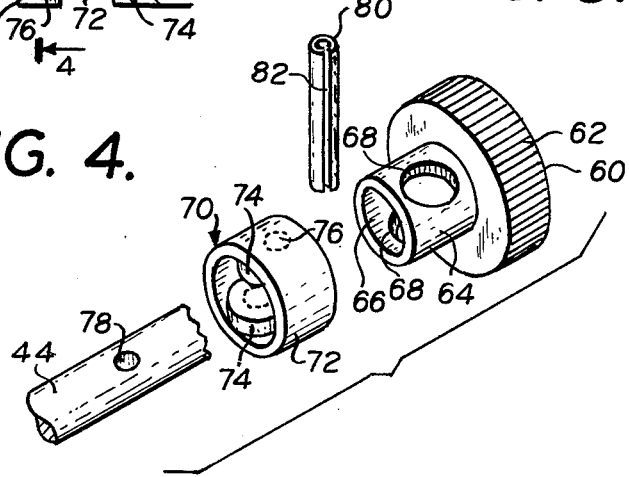

FILM DRIVE ASSEMBLY

This invention relates generally to a film drive assembly and, more particularly, pertains to a film drive assembly ideally suited for a sound recording movie camera that substantially eliminates wow and flutter sounds from being recorded on the film.

Sound recording movie cameras of the 16mm hand held type or of the type adapted to be supported on the body simultaneously record the sounds of the event being filmed on the film per se. In the past, problems have been presented by such cameras because they do not faithfully reproduce the sounds on the recording track. To be more specific, the recording medium or track is usually positioned adjacent to an edge of the film and may comprise a magnetic stripe. As the film advances past a recording head within the camera body, the sounds are recorded on the stripe. It has been found that so-called wow and flutter sounds have been recorded on the film as well as the desired sounds. As a result, expensive procedures have to be utilized to filter out the unwanted noises so that the only desired sounds are heard on playback. While the exact cause of these extraneous noises is not known it is believed that they originate in the film drive assembly due to an unbalanced load applied to the main drive shaft.

Accordingly, an object of this invention is to provide an improved film drive assembly for a sound recording movie camera.

A more specific object of this invention is the provision of a film drive assembly for a sound recording movie camera that substantially improves the recorded sound.

Another object of the present invention resides in the novel details of construction that provide a film drive assembly of the type described that is quiet in operation and economical to fabricate.

A further object of the present invention is to provide a film drive assembly for a sound recording movie camera that is reliable in operation.

Accordingly, a film drive assembly constructed according to the present invention comprises a support plate. A drive shaft is provided which is adapted to be driven by a motor and mounting means rotatably mounts the drive shaft on the support plate. A film claw for moving the film past an aperture is driven by the shaft. Film moving means is mounted on the support plate for moving the film past a preselected point. Gearing means is connected to the shaft and is in driving relationship with the film moving means to drive the film moving means. The gearing means comprises a gear in meshing engagement with the film moving means and a resilient connecting means for connecting the gear to the shaft whereby wow and flutter are substantially reduced or completely eliminated from the recording track.

Other features and advantages of the present invention will become more apparent from a consideration of the following detailed description when taken in conjunction with the accompanying drawing, in which:

FIG. 1 is a perspective view of a film drive assembly constructed according to the present invention, as seen looking from the film path side;

FIG. 2 is a front elevational view thereof;

FIG. 3 is a sectional view, to an enlarged scale, taken along the line 3—3 of FIG. 2;

FIG. 4 is a sectional view of the connecting arrangement taken along the line 4—4 of FIG. 3; and FIG. 5 is an exploded view of the connecting arrangement shown in the preceding figures.

The present invention will be described in conjunction with portions of an existing film drive mechanism and, in particular, the film drive mechanism manufactured by Bach Auricon, Incorporated of 6950 Romaine St., Hollywood, Calif. 90038 and used in its movie camera sold under the name "Cine-Voice II." Only those elements of such film drive mechanism necessary for an understanding of the present invention will be described in full herein. If additional information is desired, reference is made to the aforementioned camera. However, it is emphasized that the aforementioned mechanism is for illustration purposes only and is not to be interpreted as being a limitation on the present invention as the invention is applicable to any film drive mechanism used in a sound recording movie camera that includes a drive shaft coupled to a means for advancing film through the camera.

Film drive mechanisms of the type referred to above include a motor driven drive shaft that drives a shutter mechanism and a film claw of conventional construction which moves a movie film past the shutter to permit exposure of the frames of the film. As noted in greater detail below, the film claw mechanism is a slider-crank arrangement which produces a pulsating or eccentric load on the drive shaft. The drive shaft is also utilized to drive a flywheel which is connected to a sprocket wheel that drives the film past a recording head so that the event being filmed may be recorded directly on the film. The film is usually provided with a magnetic stripe along one edge that serves as the recording medium or track.

In the past, the flywheel was coupled to the drive shaft by a gear that was rigidly connected to the shaft. As a result of this construction, it had been found that in practice extraneous noises such as "wow" and "flutter" were transmitted to the recording medium thereby producing undesired noise on the recording track. While the cause of such noise is not precisely known, it is believed that the noise is caused by the eccentric or variable loading of the drive shaft by the claw slider-crank mechanism. However, although it is presently believed that the cause of the noise is due to such eccentric loading, it may well be that the cause originates from another source and, accordingly, the cause stated above is not to be interpreted as being a limitation of the present invention.

The present invention has been found to eliminate such noise from the recording or sound track. More specifically, in the present invention the flywheel driving gear is resiliently coupled to the drive shaft in the manner described hereinbelow. As a result of such coupling, wow and flutter are substantially eliminated.

It is to be noted that a similar coupling arrangement has been utilized in the past where a flywheel was driven directly from the output shaft of an AC motor. For this latter case, it was found that such coupling eliminated the transfer of 60 cycle hum from the motor to the sound track. However, both the environment and the purpose of this latter construction is completely remote from the present construction.

Accordingly, a film drive assembly constructed according to the present invention is designated generally by the reference numerial 10 in the figures and comprises a support plate 12 which is received within the camera body (not shown). The support plate 12 rotatably mounts a plurality of film guide rollers, designated generally by the reference character 14, which comprise a film guiding system to guide the film through the camera in a preselected path to permit exposure of the film and the recording of sound on the film. The roller guide system is conventional in construction and will not be discussed in detail herein. If more information on the particular system illustrated in the figures is desired, reference may be had to the aforementioned camera produced by Bach Auricon, Incorporated. Insofar as it is pertinent to the invention herein, it should be noted that the film (not shown) passes over the roller 16 and under the guide 18 so that the film resides substantially in a vertical plane between these elements.

The film is advanced from the roller 16 toward the guide 18 by a film claw 20 of known construction. More specifically, the claw 20 is a slider-crank arrangement having a film engaging end 22. The movement of the claw, as described in greater detail below, is such that it moves toward the film extending between the elements 16 and 18 and enters a film sprocket hole. The claw then moves downwardly thereby drawing the film downwardly toward the guide 18. Thereafter, the claw is withdrawn from the film sprocket hole and it moves upwardly to engage in the next film sprocket hole to again repeat the cycle. The claw 20 is utilized to move the film past the aperture (not shown) of the shutter mechanism (not shown).

Also mounted on the support plate 12 is a main film drive wheel 24. The wheel 24 is essentially a sprocket wheel. That is, it is provided with a plurality of circumferentially spaced sprocket teeth (not shown) adjacent to plate 12 which are adapted to enter the sprocket holes on the film as the wheel is rotated to advance the film through the camera in the conventional manner. Connected to the supporting plate 12 and positioned just below the film drive wheel 24 is a recording head 26 that is connected to an external microphone (not shown) through a record-playback amplifier or the like and is operable to record the desired sounds on the sound track on the film. The path of the film is such that the drive wheel 24 effectively pulls the film past the recording head 26.

A stud 28 having a threaded portion 30 extends outwardly of the plate 12 and is received in a corresponding bore in the camera body (not shown) and affixed in place therein by a nut engaging the threaded portion 30.

Movement of the main film drive wheel 24 is effected through a flywheel arrangement designated generally by the reference character 32. The flywheel arrangement 32 comprises a shaft 34 journaled in the plate 12 that rotates the wheel 24. Fixedly connected to the shaft 34 is a relatively heavy wheel 36 that is drivingly connected to a gear wheel 38 having teeth 40 about the periphery thereof. Accordingly, rotation of the wheel 36 causes concomitant rotation of the main film drive wheel 24 thereby causing movement of the film through the camera.

Rotation of the flywheel arrangement 32 (and operation of the film claw 20 and the shutter mechanism) is effected by a drive arrangement designated generally by the reference character 42. More specifically, the drive arrangement 42 comprises a drive shaft 44 that is received in bearings in spaced bearing supports 46 upstanding from a horizontal leg 48 that extends outwardly from the support plate 12, to rotatably support the drive shaft. A pulley 50 is fixedly connected to the end of the drive shaft and is connected to a motor (not shown) by a belt 52 (FIG. 1) so that energization of the motor will cause rotation of the drive shaft 44.

Connected to the other end of the drive shaft 44 is a helical gear 54 that is adapted to operate the shutter mechanism (not shown) of the camera and to concomitantly operate the film claw 20. That is, as shown in FIGS. 1 and 2, the claw 20 is pivotally connected to the outer face 56 adjacent the periphery of the gear 54 by a pin 53. The other end of the claw is provided with an elongated slot that receives a pin therethrough. Hence, while the upper portion of the claw 20 is free to rotate by means of its pivotal pin connection with the gear 54, the bottom portion of the claw is constrained to only execute a reciprocating motion. It will therefore be obvious that as the gear 54 rotates, the claw 20 will execute the above-described motion. That is, the claw will move inwardly toward the film and then downwardly until the pivotal connection with the gear 54 passes beyond the center point at which time the claw will move outwardly and upwardly with respect to the film.

The gear wheel 38 of the flywheel arrangement 32 is connected with the drive shaft 44 through a gearing arrangement designated generally by the reference numeral 58. The gearing arrangement 58 includes a gear 60 that is in meshing engagement with the teeth 40 on the wheel 38 thereby to rotate the wheel when the drive shaft 44 is rotated. As noted above, in the past the gear 60 was rigidly connected to the shaft 44 and, it is believed that as a result of the eccentric load caused by the claw 20 on the shaft 44, noises (e.g., wow and flutter) were introduced on the sound track of the film. However, in accordance with the present invention, the gear 60 is resiliently coupled to the shaft 44 and, as a result, such noises are eliminated.

More specifically, as shown in FIGS. 3 – 5, the gear 60 includes a toothed portion 62 in meshing engagement with the gear wheel 38, and a reduced diameter hub portion 64. An axial through bore 66 extends through the gear 60 and receives the shaft 44 therethrough. Additionally, aligned radially extending bores 68 extend through the hub portion 64 of the gear. The gear 60 may be fabricated from a hard plastic or the like.

Received on the hub portion 64 is a resilient member designated generally by the reference numeral 70. The member 70 may be fabricated from rubber or the like and comprises a band 72 that encircles the outer surface of the hub portion 64 in tight frictional engagement therewith. Radially inwardly extending diametrically opposed circular bosses 74 are provided on the inner surface of the band 72 and are adapted to be received in the bores 68 in tight frictional engagement with the walls defining the bores. A radially extending passage 76 extends through the resilient member 70 and is centrally located with respect to the bosses 74.

The shaft 44 is provided with a radially extending through bore 78. In operation, the member 70 is mounted on the hub 64 with the bosses 74 received within the bores 68. The gear 60 is then mounted on the shaft with the passage 76 in the member 70 in alignment with the bore 78 in the shaft 44. A compression pin 80 is then inserted through the passage 76 to connect the gear with the shaft so that rotation of the shaft causes concomitant rotation of the gear 60. More specifically, the pin 80 is in the form of a tube having longitudinal slot 82 and may be fabricated from a spring metal or the like. The diameter of the pin is slightly greater than the diameter of the passage 76 and the bore 78. When the pin is inserted, it is compressed so that the edges defining the slot 82 of the pin moved toward each other thereby reducing the diameter of the pin so that the diameter of the pin is smaller than the bore 78. The pin is then inserted through one end of the passage 76, through the bosses 74 and the bore 78 in the shaft 44 until it emerges from the other end of the passage 76, as shown in FIG. 3. The pin is then released and permitted to expand to its normal size. Since the diameter of the pin is normally greater than of the bore 78, the pin will essentially be press fitted to the drive shaft 44 and the gear 60. Moreover, since the pin 80 connects with the gear 60 only through member 70, the gear 60 is effectively resiliently connected with the shaft. This resilient connection eliminates noises described above heretofore recorded on the film recording track.

The bearings within the bearings support 46 are lubricated through respective oil tubes 82 which are connected to the support plate 12 which has provision to permit the insertion of oil into the tubes 82.

Accordingly, a film drive assembly has been disclosed which substantially eliminates noises such as wow and flutter from the film recording or sound track due to noises generated within the camera.

While a preferred embodiment of the invention has been shown and described herein it will be come obvious that numerous omissions, changes and additions may be made in such embodiment without departing from the spirit and scope of the present invention.

What is claimed is:

1. A film drive assembly for moving a film in a movie camera comprising a support plate; a drive shaft adapted to be driven by a motor; mounting means for rotatably mounting said drive shaft on said support plate; a film claw driven by said shaft; film moving means mounted on said support plate for moving the film past a preselected point; and gearing means connected to said shaft and in driving relationship with said film moving means to drive said film moving means; said gearing means comprising a gear in meshing engagement with said film moving means, and connecting means for connecting said gear to said shaft; said gear comprising a hub portion; and said connecting means comprising a pin extending through said hub portion and said shaft to connect said pin in driving engagement with said shaft, and a resilient member between said hub and said pin.

2. A film drive assembly as in claim 1, in which the camera is a sound recording movie camera having a recording head for recording sounds on a sound track on the film, said film moving means comprising a sprocket wheel adapted to engage sprocket holes on the film and to move the film past the recording head.

3. A film drive assembly as in claim 2, in which said film moving means comprises a flywheel arrangement having a gear wheel in meshing engagement with said gear, and said sprocket wheel is connected with said flywheel arrangement for advancing the film past the sound head.

4. A film drive assembly as in claim 2, in which said mounting means comprises at least a pair of spaced bearing supports on said plate, a bearing in each of said supports for rotatably supporting said drive shaft, and lubrication means connected to each of said bearing supports for lubricating said bearings.

5. A film drive assembly as in claim 1, in which said hub portion comprises a reduced diameter portion axially receiving said shaft therethrough, a radial through bore in said hub portion, said resilient member being positioned in said through bore, and said pin extending through said resilient member and said shaft and being in tight frictional engagement therewith.

6. A film drive assembly as in claim 5, in which said hub portion is provided with a pair of aligned through bores, and said resilient member comprises a band received on said hub portion, a pair of radially inwardly extending bosses on the inner surface of said band each received in a respective one of said bores in tight frictional fit therewith, said pin extending through said bosses and said shaft in a press fit therewith.

7. A film drive assembly as in claim 6, in which said resilient member is fabricated from rubber.

\* \* \* \* \*